TRI-CAPSTAN DRIVE AND WEB TENSIONER

Filed May 26, 1967

INVENTOR.
ROBERT F. McCAMMON

BY M. Michael Carpenter

ATTORNEY.

United States Patent Office 3,421,674

Patented Jan. 14, 1969

3,421,674

TRI-CAPSTAN DRIVE AND WEB TENSIONER

Robert F. McCammon, Denver, Colo., assignor to Honeywell Inc., Minneapolis, Minn., a corporation of Delaware Filed May 26, 1967, Ser. No. 641,663

U.S. Cl. 226—195 9 Claims

Int. Cl. B65h *23/00;* B65h *77/00*

ABSTRACT OF THE DISCLOSURE

A tri-capstan drive arrangement is shown having three capstans with associated capstan pulleys driven by a fourth motor pulley. An elastic belt links the four pulleys into a driving arrangement, which allows the tri-capstan drive to rotate in either direction with the leading capstan always rotating at a faster revolution per unit time than the following capstan. The difference in the rate of rotation provides for tensioning a magnetic tape between the tri-capstans. This arrangement isolates the tape from outside vibrational disturbances as the tape is passed over magnetic heads which are located between the capstans.

The present invention relates to a drive mechanism and, more particularly to a tri-capstan drive mechanism which provides for tensioning a web member between each capstan as the web member is driven thereby in either direction.

The use of a capstan to drive a web member is well known in the art. For example, in a magnetic tape record and/or reproduce system, a capstan and a rubber coated pressure roller have often been utilized for engaging a magnetic tape therebetween and imparting a linear driving motion thereto. Magnetic tape record and/or reproduced systems have drive mechanisms which are generally classified into one of two groups. The first group utilizes a closed loop system wherein the tape passes over one side of the capstan, around a turn around roller, and back over the other side of the capstan. This type of system utilizes a pair of pressure rollers on each side of the capstan to urge the magnetic tape into contact therewith. The closed loop thus formed provides a means for tensioning the magnetic tape across magnetic heads which are mounted between the capstan and a turn around roller and contact the tape on either side of the loop. The second group of drive mechanisms is an open loop system which utilizes a pair of capstans wherein the tape is stretched therebetween. A pressure roller is individually associated with each capstan for urging the tape thereagainst, thus forming an isolated section of tape therebetween. The magnetic heads are generally located within this isolated section of tape. Each of these basic drive mechanisms provide a means for isolating the magnetic tape in the area adjacent to the magnetic heads associated therewith. Other magnetic tape systems have utilized a single rubber coated capstan having the magnetic tape wrapped 180° about the capstan periphery for imparting a driving motion to the tape. Utilizing this type of arrangement, the magnetic heads are often located adjacent to the capstan periphery for engaging the tape thereagainst. This arrangement also forms a means for isolating the magnetic tape from external vibratory disturbances where the capstan is supporting the tape.

These prior art drive mechanisms have proved successful for many applications. The present invention seeks to provide a drive mechanism which isolates the magnetic tape from external vibrations, as it passes over the magnetic heads, without utilizing pressure rollers. It is also desired to provide a drive mechanism that has a tape threading pattern which may be quickly and conveniently threaded for simplicity of operation.

Accordingly, one object of the present invention is to provide an improved drive mechanism for a flexible web member.

Another object of the present invention is to provide an improved tri-capstan drive mechanism which is capable of tensioning the magnetic tape that is driven thereby at a predetermined tension between each of the three capstans.

Still another object of the invention presented herein is to provide a tri-capstan drive mechanism with a means for isolating the magnetic tape from external vibrations as it passes across magnetic heads associated with the tri-capstan drive mechanism.

A further object of the present invention provides for establishing a tri-capstan drive mechanism which does not require the use of pressure roller for imparting a driving motion to the magnetic tape associated therewith.

Yet a further object of the present invention is to provide a tri-capstan drive mechanism which is capable of improving the recording and/or reproducing of electromagnetic signals upon the magnetic tape.

A still further object of the invention described herein is to provide a tri-capstan drive mechanism which is capable of driving the magnetic tape associated therewith through a bidirectional tape path while providing a predetermined tension therein, between successive capstans, in each direction.

Other objects and many of the attendant advantages of the present invention will become readily apparent to those skilled in the art as a better understanding thereof is obtained by reference to the following description when considered in connection with the accompanying drawings, wherein.

Figure 1:
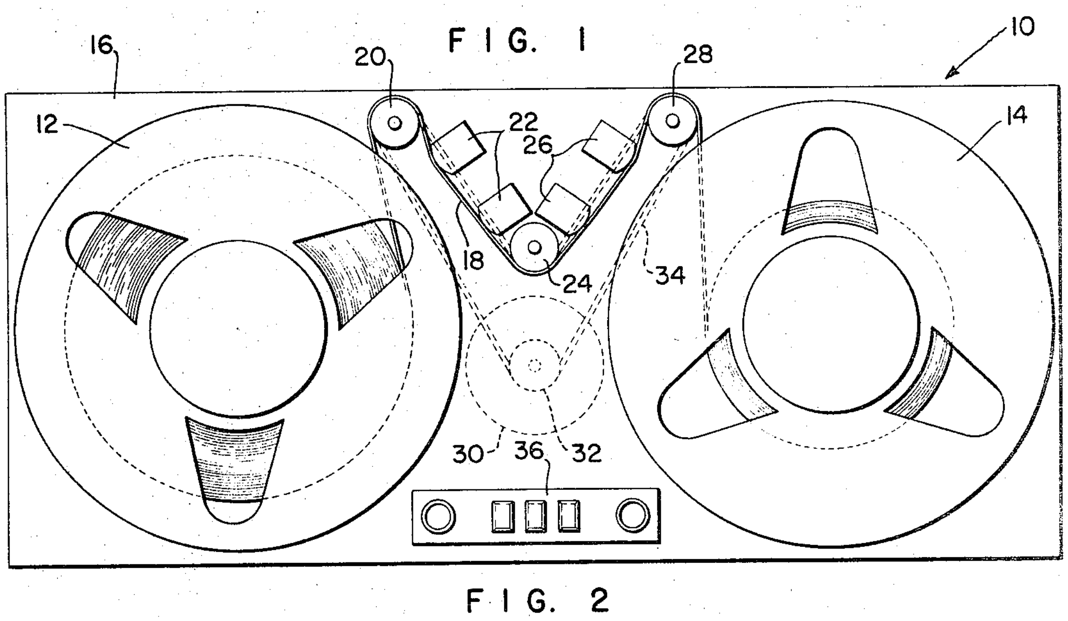
FIG. 1 is a plan view, showing a typical magnetic tape record and/or reproduce system incorporating one embodiment of the present invention.

Referring now to the drawing, FIG. 1 shows a magnetic tape record and/or reproduce system 10 having a supply and take-up reel 12 and 14, respectively, rotatably mounted upon a main frame 16. A magnetic tape 18 is shuttled from the supply reel 12 around a first capstan 20, across a first pair of magnetic heads 22, around a second capstan 24, across a second pair of magnetic heads 26, and around a third capstan 28 before it is finally wrapped upon the take-up reel 14. A drive motor 30 is provided with a motor pulley 32 for driving an elastic belt 34. The elastic belt may be constructed from several materials, such as a seamless belt constructed from polyethylene terephthalate. This material may be pretreated to provide a predetermined amount of stretch per unit length. From the motor pulley 32 the elastic belt 34 is wrapped around a capstan pulley, not shown, which mounts on the opposite side of the main frame 16 from the capstan 28. The capstan 28 is connected to the capstan pulley by a suitable shaft that rotatably mounts within a bearing housing located in the main frame 16. After wrapping around the capstan pulley associated with capstan 28, the elastic belt 34 is wrapped around a second capstan pulley associated with capstan 24 and then around a final capstan pulley associated with capstan 20. From the final capstan pulley the belt 34 wraps around the motor pulley 32 to complete its loop. It should be noted that each capstan pulley has a single periphery or diameter which is equal to the others and also equal to the single periphery of the motor pulley 32. However, the pulleys may be progressively smaller, but the drive becomes unidirectional. A control panel 36 is provided for controlling the magnetic tape record and/or reproduce system 10 in a conventional manner.

Figure 2:
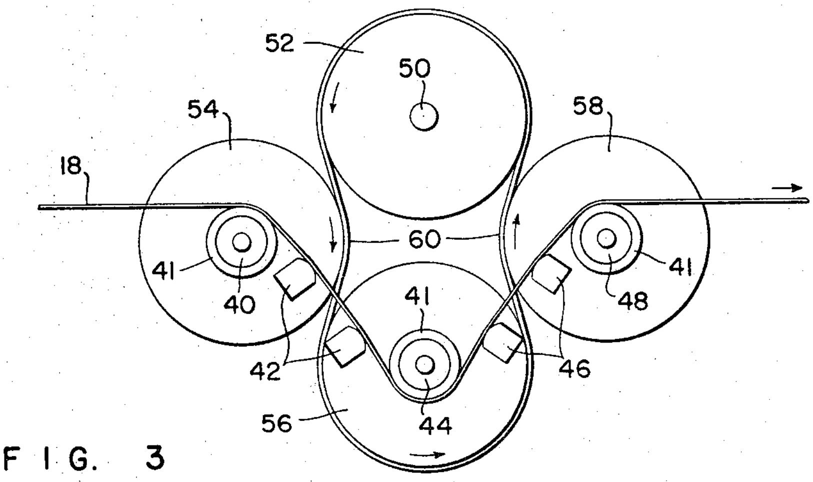
FIG. 2 is a plan view, showing a second preferred embodiment of the present invention.

A second embodiment of the present invention is illustrated in FIG. 2. This embodiment utilizes the same number of components as the embodiment of FIG. 1; however, the arrangement is varied to increase the stability of the drive system as will be described hereinbelow. Assuming that the magnetic tape is moving from left to right, the tape 18 wraps about a first capstan 40 having an elastomeric covering 41 thereon. The elastomeric covered capstan provides a nonslipping contact with the magnetic tape 18. The elastomeric material may be formed from many substances, such as polyurethane iso-elastomer. As the magnetic tape departs from the capstan roller 40 it passes over a pair of magnetic heads 42 and wraps about a second roller 44, also having an elastomeric covering thereon. From the second capstan 44 the magnetic tape passes over a second pair of magnetic heads 46 and wraps about a third elastomeric covered capstan 48 which, in the direction indicated, form the leading capstan. A capstan drive motor 49, FIG. 3, having a shaft 50 drives a motor pulley 52. The first capstan 40 is provided with a capstan pulley 54 having a single periphery or diameter equal the diameter of the motor pulley 52. Second capstan 44 and third capstan 48 are also provided with capstan pulleys 56 and 58, respectfully, which have diameters equaling the diameter of the capstan pulley 54 and motor pulley 52.

An elastic belt 60, similar to the belt 34, wraps about the motor pulley 52 and then about the second capstan pulley 56. Capstan pulleys 54 and 58 engage the opposite surface of the elastic belt 60 for urging it inwardly toward a center line between the motor pulley 52 and capstan pulley 56. In this manner, the driving motion of the motor pulley 52 is imparted to each of the capstan pulleys 54, 56, and 58. As the diameters of the capstan pulleys are equal to the diameter of the motor pulley 52, the rotational speed of each capstan pulley will be generally the same as the motor pulley. However, due to the elasticity of the belt 60, the motor pulley 52 drives the third capstan pulley 58, when the motor rotates in a counterclockwise direction, at a faster speed than the second capstan pulley 56 and drives the second capstan pulley 56 at a faster speed than the first capstan pulley 54. Through this arrangement, the leading capstan 48, which is the last capstan to contact the magnetic tape, is driven at a slightly faster rotational speed than the second capstan 44. Further, the second capstan 44 is driven at a slightly faster rotational speed than the first capstan 40. This phenomenon occurs due to the stretching of the elastic belt 60. That is, as the motor pulley 52 rotates in a counterclockwise direction, it drives the third capstan pulley 58 in a clockwise direction. Since the belt is slightly elastic, the force necessary to drive the third capstan pulley 58 also causes a slight stretching of the belt 60 which allows the third capstan pulley 58 and its associated capstan 48 to rotate at a slightly reduced speed. As the belt 60 drives the second capstan pulley 56 in a counterclockwise direction, stretching also occurs between the third capstan pulley 58 and the second capstan pulley 56. This stretching provides for a slightly lower rotational speed of the second capstan 44. In the same manner, the capstan 40 rotates at a slightly lower rotational speed than the capstan 44. As the capstan 40 and its associated capstan pulley 54 are now rotating at a lower rotational speed than the motor pulley 52, some provision must be made to compensate for the difference therebetween. This is provided by the elastic belt 60 in the area between the first capstan pulley 54 and the motor pulley 52. In this area the tension in the elastic belt 60 is substantially less than in other unsupported belt areas. Thus, the elastic belt shrinks in this area due to the fact that the tension therein is substantially less than in other unsupported belt areas.

Figure 3:
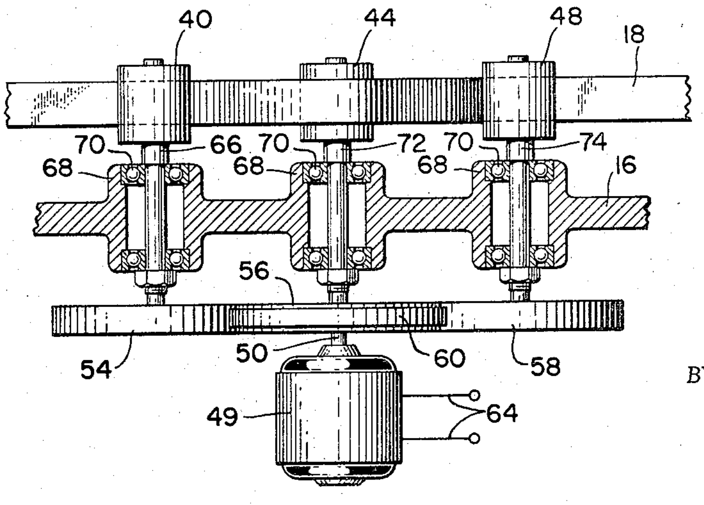
FIG. 3 is a sectional view, showing a side elevation of the embodiment of FIG. 2.

The drive system of FIG. 2 is shown in FIG. 3 wherein the motor 49 is schematically shown having leads 64. The motor shaft 50 is pressed into the motor pulley 52 for imparting rotational motion to the elastic belt 60. The first capstan 40 is provided with a shaft 66 which connects the capstan to its capstan pulley 54. This shaft 66 passes through the main frame 16 where a suitable bearing housing 68 may be provided for supporting a pair of ball bearings 70 which rotationally mount the shaft of the capstan assembly thus described. In a similar manner, second capstan 44 and capstan pulley 56 are provided with a shaft 68, and third capstan 48 and capstan pulley 58 are provided with a shaft 70.

The tri-capstan drive mechanism operates to tension the magnetic tape 18 over the magnetic heads 42 and 46 as the tape is shuttled from left to right between the reels 12 and 14 by the coaction of the three capstans. The amount of additional tension within the tape between the capstans may be precisely controlled by the predetermined amount of stretch designed into the elastic belt 60. First consider the heads 46 between the leading capstan 48, where the motor 49 is rotating counterclockwise, and the second capstan 44. In this area the belt stretch may be varied by the material of the belt 60 and the length of unsupported belt between the motor pulley 52 and capstan pulley 58. In the preferred embodiment described in FIG. 2, this length of unsupported belt has been shown generally larger than in practice, for purposes of illustration. The length of unsupported belt should be kept as small as possible to eliminate low frequency oscillation within the drive system. Due to the stretching of the belt, the capstan 44 rotates at a slower speed than the capstan 48 for tensioning the tape 18 therebetween. One purpose of the second capstan 44 is to minimize the free length of unsupported magnetic tape and thus minimize instantaneous velocity changes within the magnetic tape itself. These instantaneous velocity changes with the magnetic tape are known in the art as flutter. Between the capstan 44 and capstan 40 the magnetic tape 18 is also tensioned for providing a suitable contact across the magnetic heads 42. The capstan pulley 56 rotates at a faster speed than the capstan pulley 54 due to further belt stretching therebetween for creating a similar difference between the rotational speeds of the capstans 44 and 40. Through the arrangement thus described, the tape is maintained under tension across the magnetic heads 42 and 46 for isolating external vibratory disturbance therefrom.

If the tape were shuttled from right to left, it can be seen that the reverse rotation of the motor pulley 52 would in turn reverse the rotational motion of the capstan pulleys 54, 56, and 58. Under these conditions, the leading capstan would become capstan 40 which would rotate at a slightly higher rotational speed than capstan 44. Further, capstan 44 would rotate at a slightly higher rotational speed than the third capstan 48. In clockwise rotation the elastic belt 60 would stretch between the motor pulley 52 and the capstan pulley 54 for first reducing the rotational speed of capstan 40. The elastic belt would continue to stretch between the capstan pulley 54 and the capstan pulley 56 and further stretch between the capstan pulley 56 and capstan pulley 58. Elastic belt 60 would then tend to shrink between the capstan pulley 58 and motor pulley 52 before returning to its normal configuration as it passed around motor pulley 52.

Accordingly, a tri-capstan drive mechanism has been shown which provides a means for tensioning the magnetic tape across the magnetic heads for isolating the head area from external vibratory disturbances, such as those caused by the reels. Further, this mechanism is equally adapted for a bidirectional tape motion. The drive mechanism provides for the elimination of low frequency oscillation therein which would be reflected during recording and/or reproduction as error. The tape passes over the magnetic heads through the simplified tape path provided by the drive mechanism of the present invention which is characterized by the lack of pressure rollers. The magnetic tape within the isolated areas between the capstans is provided with a minimum amount of free length for minimizing disturbances which could occur during recording and/or reproduction. The preferred embodiment of FIG. 2 has been modified in FIG. 1 to provide a bidirectional tri-capstan drive mechanism within the compact magnetic tape system illustrated there.

Obviously, many modifications and variations of the present invention will become apparent to those skilled in the art in light of the above teachings; and it should therefore be understood that the embodiments described hereinabove are illustrations rather than limitations of the scope of the present invention. Consequenty, the present invention should be limited only by the appended claims.

The embodiments of the invention in which an exclusive property or privilege is claimed are defined as follows:

1. A drive mechanism for imparting a predetermined tension to a web member driven thereby and thus isolating said web member for vibratory disturbances, comprising:
- driving means;
- a driving pulley means associated with said driving means;
- first, second, and third capstan means arranged for contacting said web member;
- first, second, and third capstan pulley means associated with said capstan means;
- said first, second, and third capstan pulley means having peripheries equal to each other and equal to the periphery of said driving pulley means; and
- belt means for transmitting a rotational driving motion from said driving pulley means to said first, second, and third capstan pulley means for driving said first capstan means faster than said second capstan means and said second capstan means faster than said third capstan means and thereby tensioning said web member therebetween.

2. A drive mechanism as claimed in claim 1 wherein said belt means comprises elastic belt means for imparting a bidirectional driving motion to said web member.

3. A drive mechanism as claimed in claim 2 wherein said elastic belt means comprises a single belt means; said driving pulley means is arranged with a single periphery; and said first, second, and third capstan pulley means are each arranged with a single periphery.

4. A drive mechanism as claimed in claim 3 additionally comprising said elastic belt means having first and second surfaces, said belt means wrapped about said driving pulley means and said second capstan pulley means with said first surface thereof contacting said pulley means, and said first capstan pulley means and said third capstan pulley means contacts said second surface of said elastic belt means for providing a pretension therein.

5. A drive mechanism as claimed in claim 4 wherein said web member comprises first and second surfaces, said first surface of said web member contacts the periphery of said first and third capstan means, and said second surface of said web member contacts the periphery of said second capstan means.

6. A drive mechanism as claimed in claim 1 wherein said web member comprises magnetic tape.

7. A drive mechanism as claimed in claim 6 wherein said capstan means includes an elastomeric covering about the periphery thereof for engaging said magnetic tape.

8. A drive mechanism as claimed in claim 1 wherein said driving pulley means and said first, second, and third capstan pulley means are arranged in close tangential relationship to each other for minimizing the unsupported length of said belt means therebetween.

9. A bidirectional tri-capstan drive mechanism for imparting a predetermined tension to a magnetic tape driven thereby and thus isolating said tape from vibrating disturbances, comprising:
- driving motor means having an output shaft;
- a driving pulley having a single periphery attached to said output shaft;
- first, second, and third capstans having an elastomeric covering for contacting said tape;
- first, second, and third capstans pulleys respectively associated with said capstans each having a single periphery equal to the other and equal to said driving pulley periphery;
- a single elastic belt having first and second surfaces;
- said first elastic belt surface wrapped about said driving pulley and said second capstan pulley; and
- said second elastic belt surface contacting said first and said third capstan pulleys; said elastic belt thus arranged for driving consecutive capstan pulleys at consecutively slower speeds in either direction for providing a bidirectional tape drive mechanism that isolates said tape.

References Cited

UNITED STATES PATENTS

| | | | |
|---|---|---|---|
| 3,282,488 | 11/1966 | Bauer | 226—195 |
| 3,335,929 | 8/1967 | Branco | 266—108 |

M. HENSON WOOD, Jr., *Primary Examiner.*

R. A. SCHACHER, *Assistant Examiner.*